(12) United States Patent
Wong et al.

(10) Patent No.: US 11,690,043 B2
(45) Date of Patent: *Jun. 27, 2023

(54) PAGING METHOD AND APPARATUS FOR WIRELESS COMMUNICATION SYSTEM

(71) Applicant: Sony Group Corporation, Tokyo (JP)

(72) Inventors: Shin Horng Wong, Basingstoke (GB); Martin Warwick Beale, Basingstoke (GB); Samuel Asangbeng Atungsiri, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 17/443,454

(22) Filed: Jul. 26, 2021

(65) Prior Publication Data

US 2021/0360581 A1 Nov. 18, 2021

Related U.S. Application Data

(63) Continuation of application No. 16/646,145, filed as application No. PCT/EP2018/075788 on Sep. 24, 2018, now Pat. No. 11,102,755.

(30) Foreign Application Priority Data

Sep. 28, 2017 (EP) ..................................... 17193861

(51) Int. Cl.
*H04W 68/00* (2009.01)
*H04W 76/28* (2018.01)
(Continued)

(52) U.S. Cl.
CPC ..... *H04W 68/005* (2013.01); *H04W 52/0229* (2013.01); *H04W 56/001* (2013.01); *H04W 76/28* (2018.02)

(58) Field of Classification Search
CPC ............... H04W 68/005; H04W 76/28; H04W 52/0029; H04W 56/001
(Continued)

(56) References Cited

U.S. PATENT DOCUMENTS

| 11,102,755 B2 * | 8/2021 | Wong ................. H04W 68/025 |
| 2004/0146020 A1 | 7/2004 | Kubler et al. |

(Continued)

FOREIGN PATENT DOCUMENTS

WO 2018/202751 A1 11/2018

OTHER PUBLICATIONS

International Search Report and Written Opinion dated Dec. 3, 2018 for PCT/EP2018/075788 filed on Sep. 24, 2018, 10 pages.
(Continued)

*Primary Examiner* — Nghi H Ly
(74) *Attorney, Agent, or Firm* — Xsensus LLP

(57) ABSTRACT

A method of operating an infrastructure node in a wireless communications system is provided. The method comprises detecting that downlink messages for a communications device to decode should be transmitted by the node in one or more of a plurality or temporally spaced paging occasions, and determining that a wake-up signal (WUS) should be transmitted by the node to the communications device in advance of each of the one or more paging occasions which comprise the downlink messages for the communications device to decode, determining that a time since a most recent transmission of a signal which can be used by the communications device to re-synchronise with the node is greater than a predetermined threshold and transmitting, in response to determining that the time since the most recent transmission from the infrastructure equipment to the communications device is greater than the predetermined threshold, a preamble signal to the communications device.

20 Claims, 9 Drawing Sheets

(51) Int. Cl.
*H04W 52/02* (2009.01)
*H04W 56/00* (2009.01)

(58) Field of Classification Search
USPC ............... 370/329, 328, 338, 341, 345, 350
See application file for complete search history.

(56) References Cited

U.S. PATENT DOCUMENTS

| | | | |
|---|---|---|---|
| 2009/0253443 A1 | 10/2009 | Bichot | |
| 2010/0317374 A1 | 12/2010 | Alpert et al. | |
| 2013/0083753 A1* | 4/2013 | Lee ................... | H04W 74/0833 370/329 |
| 2014/0086176 A1 | 3/2014 | Liu et al. | |
| 2014/0120959 A1 | 5/2014 | Kang et al. | |
| 2015/0334668 A1* | 11/2015 | Weber ................... | H04M 11/04 370/336 |
| 2016/0366644 A1* | 12/2016 | Ghosh ............... | H04W 52/0235 |
| 2017/0026219 A1 | 1/2017 | Atungsiri | |
| 2017/0026220 A1 | 1/2017 | Atungsiri | |
| 2017/0026221 A1 | 1/2017 | Atungsiri | |

OTHER PUBLICATIONS

3GPP, "5G; Evolved Universal Terrestrial Radio Access (E-UTRA); User Equipment (UE) procedures in idle mode," Technical Specification 36.304 version 15.4.0, Release 15, Jun. 2019, pp. 1-55.

3GPP, "5G; Evolved Universal Terrestrial Radio Access (E-UTRA); Medium Access Control (MAC) protocol specification," Technical Specification 36.321, version 15.6.0, Release 15, Jun. 2019, pp. 1-133.

Hambeck, C. et al., "A 2.4μW Wake-up Receiver for Wireless Sensor Nodes with -71dBm Sensitivity," Proceesings of the IEEE International Symposium on Circuits and Systems (ISCAS) May 15-18, 2011, pp. 534-537.

Ericsson and Qualcomm "New WID on Even further enhanced MTC for LTE," 3GPP TSG RAN Meeting #75, RP-170732, Dubrovnik, Croatia, Mar. 6-9, 2017, 4 pages.

Ericsson, "Revised WID for Further Enhanced MTC for LTE," 3GPP TSG RAN Meeting #73, RP-161464 revision of RP-161321, New Orleans, USA, Sep. 19-22, 2016, 6 pages.

Holma, H., and Toskala, A., "LTE for UMTS OFDMA and SC-FDMA based radio access," John Wiley and Sons, Apr. 2009, 8 pages.

Holma, H., and Toskala, A., "LTE for UMTS OFDMA and SC-FDMA based radio access," John Wiley and Sons, Apr. 2009, pp. 25-27.

Huawei and Hisilicon, "Revised work item proposal: Enhancements of NB-IoT," 3GPP TSG RAN Meeting #73, RP-161901 revision of RP-161324, New Orleans, USA, Sep. 19-22, 2016, 8 pages.

Huawei et al., "New WID on Further NB-IoT enhancements," #3GPP TSG RAN Meeting #75, RP-170852, Dubrovnik, Croatia, Mar. 6-9, 2017, 6 pages.

Sierra Wireless, "Idle Mode Power Efficiency Reduction," 3GPP TSG RAN WG1 Meeting #89, R1-1708311, Hangzhou, China, May 15-19, 2017, 6 pages.

Sony, "UE Power Saving in NR," 3GPP TSG RAN NR AH3, R1-1716649, Nagoya, Japan, Sep. 18-21, 2017, 5 pages.

Sony, "Wake up signalling for efeMTC," 3GPP TSG RAN WG1 Meeting #90, R1-1712956, Prague, Czech Republic, Aug. 21-25, 2017, 11 pages.

* cited by examiner

US 11,690,043 B2

PAGING METHOD AND APPARATUS FOR WIRELESS COMMUNICATION SYSTEM

CROSS-REFERENCE TO RELATED APPLICATIONS

The present application is a continuation of U.S. application Ser. No. 16/646,145, filed Mar. 11, 2020, which is based on PCT filing PCT/EP2018/075788, filed Sep. 24, 2018, which claims priority to EP 17193861.6, filed Sep. 28, 2017, the entire contents of each are incorporated herein by reference.

BACKGROUND

Field of Disclosure

The present disclosure relates to infrastructure equipment and communications devices of wireless communications systems, where infrastructure equipment are configured to transmit Wake-Up Signals (WUSs) in advance of transmitting downlink messages to communications devices.

The present application claims the Paris Convention priority of European patent application EP17193861.6, the contents of which are hereby incorporated by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or implicitly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things" and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data.

The increasing use of different types of terminal devices associated with different traffic profiles gives rise to new challenges for efficiently handling communications in wireless telecommunications systems that need to be addressed.

SUMMARY OF THE DISCLOSURE

The present disclosure can help address or mitigate at least some of the issues discussed above.

Embodiments of the present technique can provide a method of operating an infrastructure equipment in a wireless communications system. The wireless communications system comprises the infrastructure equipment and a communications device, and the method comprises detecting that downlink messages for the communications device to decode should be transmitted by the infrastructure equipment in one or more of a plurality of temporally spaced paging occasions, and determining that a wake-up signal, WUS, should be transmitted by the infrastructure equipment to the communications device in advance of each of the one or more paging occasions which comprise the downlink messages for the communications device to decode, determining that a time since a most recent transmission of a signal which can be used by the communications device to re-synchronise with the infrastructure equipment is greater than a predetermined threshold and transmitting, in response to determining that the time since the most recent transmission from the infrastructure equipment to the communications device is greater than the predetermined threshold, a preamble signal to the communications device, the preamble signal for use by the communications device as a synchronisation signal for the communications device to re-synchronise its timing with the infrastructure equipment.

In some embodiments the preamble signal provides an indication to the communications device to go to sleep, whereby the communications device can reduce an amount of power consumer by its receiver, or to wake-up, whereby the communications device applied power to its receiver to receiver signals within a paging time window.

Further embodiments of the present technique can provide a method of operating an infrastructure equipment in a wireless communications system. The wireless communications system comprises the infrastructure equipment and a communications device, and the method comprises detecting that downlink messages for the communications device to decode should be transmitted by the infrastructure equipment during one or more of a plurality of temporally spaced paging time windows, each paging time window comprising one or more of a plurality of temporally spaced paging occasions, and determining that a wake-up signal, WUS, should be transmitted by the infrastructure equipment to the communications device in advance of each of the one or more paging occasions which comprise the downlink messages for the communications device to decode and transmitting, in advance of every N of the paging time windows, where N is an integer which equals one or more, a preamble signal to the communications device, the preamble signal for use by the communications device as a synchronisation signal for the communications device to re-synchronise its timing with the infrastructure equipment.

Embodiments of the present technique, which further relate to infrastructure equipment, communications devices, methods of operating communications devices and infrastructure equipment and circuitry for communications devices and infrastructure equipment, allow for the network to transmit a preamble whenever there is inactivity for a long period of time, whilst also using the WUS prior to a PO for which there is a potential paging message. This preamble acts as a synchronisation signal for the UE to re-sync with the eNodeB.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding, parts throughout the several views, and wherein.

DETAILED DESCRIPTION OF THE EMBODIMENTS

Long Term Evolution Advanced Radio Access Technology (4G)

Figure 1:
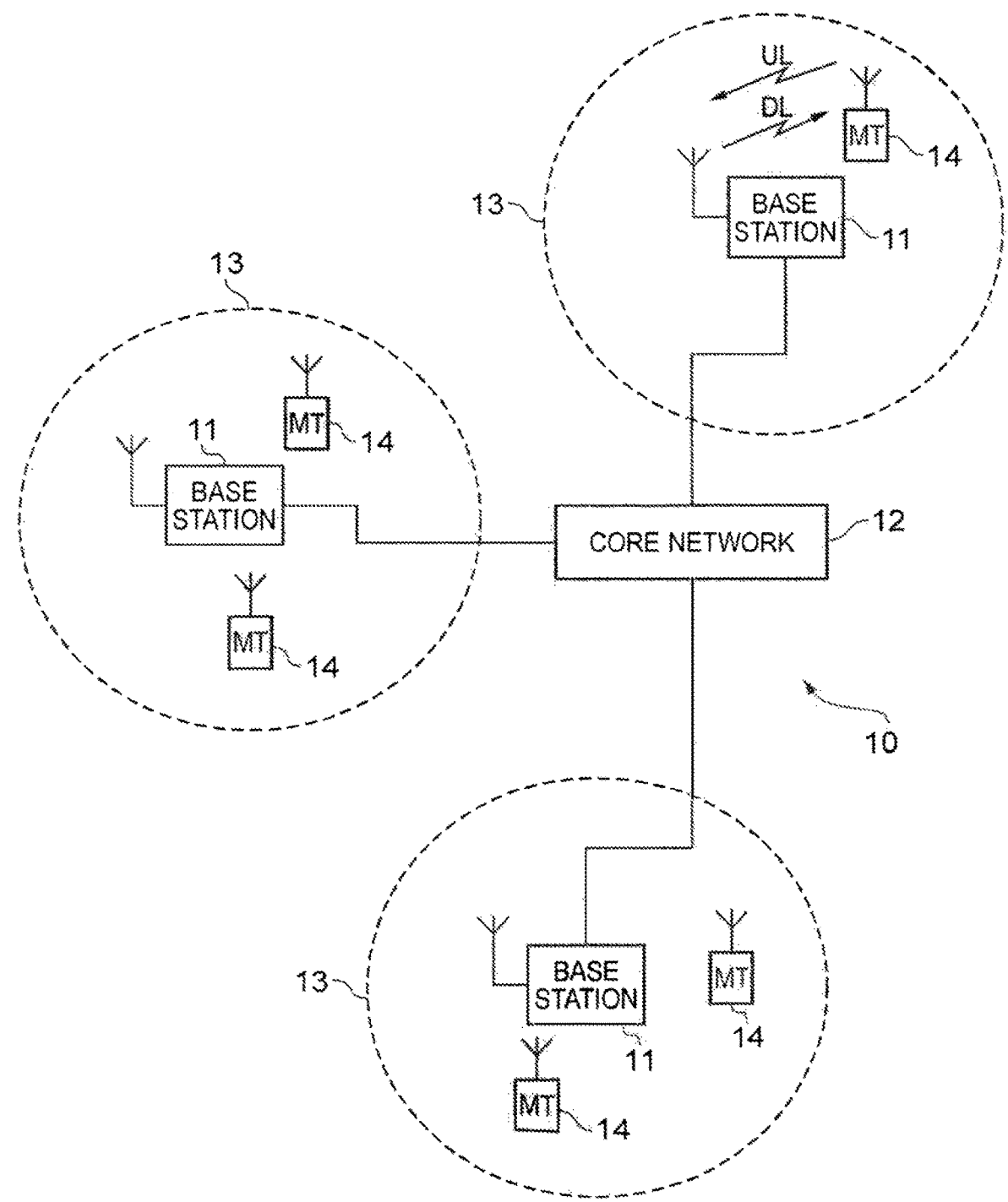
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [5], It will be appreciated that operational aspects of the telecommunications networks discussed herein which are not specifically described (for example in relation to specific communication protocols and physical channels ha communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink. Data is transmitted from terminal devices 14 to the base stations 11 via a radio uplink. The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
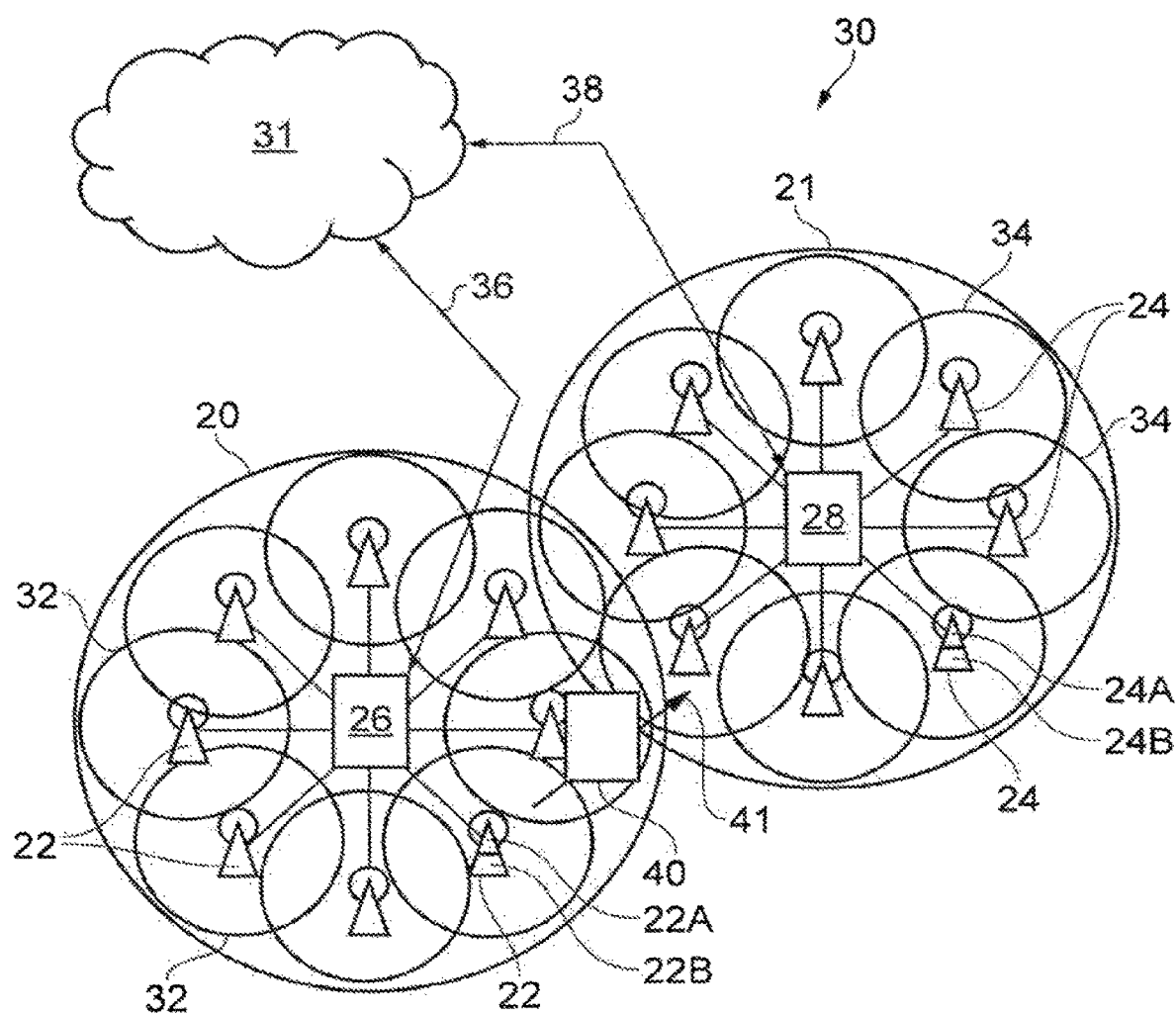
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the come network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and or the distributed units/TRPs.

A terminal device 40 is represented in FIG. 2 within the coverage area of the first communication cell 20. This terminal device 40 nits thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some, implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating. In such cases, as far as the terminal device is concerned, it simply transmits uplink data to the controlling node 26 and receives down link data from the controlling node 26 and the terminal device has no awareness of the involvement of the distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

As is well understood, various wireless telecommunications networks, such as the LTE-based network represented in FIG. 1 and the NR-based network represented in FIG. 2, may support different Radio Resource Control (RRC) modes for terminal devices, typically including: (i) RRC idle mode (RRC_IDLE); and (ii) RRC connected node (RRC_CONNECTED). When a terminal device transmits data, RRC connected mode is generally used. The RRC idle mode, on the other hand, is for terminal devices which are registered to the network (EMM-REGISTERED), but not currently in active communication (ECM-IDLE). Thus, generally speaking, in RRC connected mode a terminal device is connected to a radio network access node (e.g. an LTE base station) in the sense of being able to exchange user plane data with the radio network access node. Conversely, in RRC idle mode a terminal device is not connected to a radio network access node in the sense of not being able to communicate user plane data using the radio network access node. In idle mode the terminal device may still receive some communications from base stations, for example reference signalling for cell reselection purposes and other broadcast signalling. The RRC connection setup procedure of going from RRC idle mode to RRC connected mode may be referred to as connecting to a cell/base station.

For a terminal device in RRC idle mode the core network is aware that the terminal device is present within the network, but the radio access network (RAN) part (comprising radio network infrastructure equipment such as the base stations 11 of FIG. 1 and/or the combined TRPs/CUs of FIG. 2) is not. The core network is aware of the location of idle mode terminal devices at a paging tracking area level but not at the level of individual transceiver entities. The core network will generally assume a terminal device is located within the tracking area(s) at with a transceiver entity most recently used for communicating with the terminal device, unless the terminal device has since provided a specific tracking area update (TAU) to the network. (As is conventional, idle mode terminal devices are typically required to send a TAU when they detect they have entered a different tracking area to allow the core network to keep track of their location.) Because the core network tracks terminal devices at a tracking area level, it is generally not possible for the network infrastructure to know which specific transceiver entities (radio network node) to use when seeking to initiate contact with a terminal device in idle mode. Consequently, and as is well known, when a core network is required to connect to an idle mode terminal device a paging procedure is used.

In a typical currently deployed network, idle mode terminal devices are configured to monitor for paging messages periodically. For terminal devices operating in a discontinuous reception (DRX) mode this occurs when they wake up for their DRX awake time. Paging signals for a specific terminal device are transmitted in defined frames (Paging Frames)/sub-frames (Paging Occasions) which for a given terminal device may be derived from the International Mobile Subscriber Identifier (IMSI) of the terminal device, as well as paging related DRX parameters established in system information transmitted within the network.

In a conventional system terminal device thus receives and checks the contents of specific sub-frames (paging occasions) in specific frames (paging frames) to look for paging signalling. For example, in accordance with the standards set out in 3GPP TS 36.304 version 14.2.0 Release 14 [6], a Paging Frame (PF) is a downlink radio frame which may contain one or more Paging Occasion(s) (PO), where a Paging Occasion is a sub-frame where there may be P-RNTI transmitted on PDCCH (or equivalent channel depending on implementation, e.g. on MPDCCH for MTC or for NB-IOT on NPDCCH) addressing the paging message. Paging messages are conveyed on a physical downlink shared channel (PDSCH) on resources identified from an allocation message addressed to a paging radio network temporary identifier (P-RNTI) and conveyed on a physical downlink control channel (PDCCH). P-RNTI is a common identifier for all terminal devices (e.g. set at FFFE in hexa-decimal for the standard defined by 3GPP TS 36.321 version 13.5.0 Release 13 [7]). All terminal devices check whether PDCCH at specific PFs/POs configured for their use include P-RNTI or not. If there is a PDSCH allocation addressed to P-RNTI in the relevant subframe the terminal device proceeds to seek to receive and decode the paging messages transmitted on the allocated resources on PDSCH. The UE then checks the list of IDs contained in the paging record list in the received paging message, to determine whether the list contains an ID corresponding to itself (for example P-TMSI or IMSI), and if so initiates a paging response.

Although the above description has summarised an example existing LTE paging procedure, it is expected that broadly similar principles may be adopted for future wireless telecommunications networks based on newer radio access technologies (RATs), such as 5G networks. The above-description of a paging procedure has referred to specific channel names which are commonly used in LTE, such as PDCCH and PDSCH, and this terminology will be used throughout this description for convenience, it being appreciated that in certain implementations different channel names may be more common. For example in the context of a wireless telecommunications system having dedicated channels for communicating with certain types of terminal devices, for example MTC devices, it may be expected the corresponding channel names may be modified. For example, a physical downlink control channel dedicated for MTC devices may be referred to as MPDCCH and a corresponding physical downlink shared channel for MTC devices may be referred to as MPDSCH.

In proposed approaches for eNB-IoT and feMTC in accordance with 3GPP release 14, a terminal device in DRX in idle mode is required to decode PDCCH (or equivalent downlink control channel for the specific implementation at hand) to identify if there are resources scheduled on PDSCH (or equivalent downlink shared channel for the specific implementation at hand) for a paging message during paging occasions in which the terminal device might receive a paging message.

Figure 3:
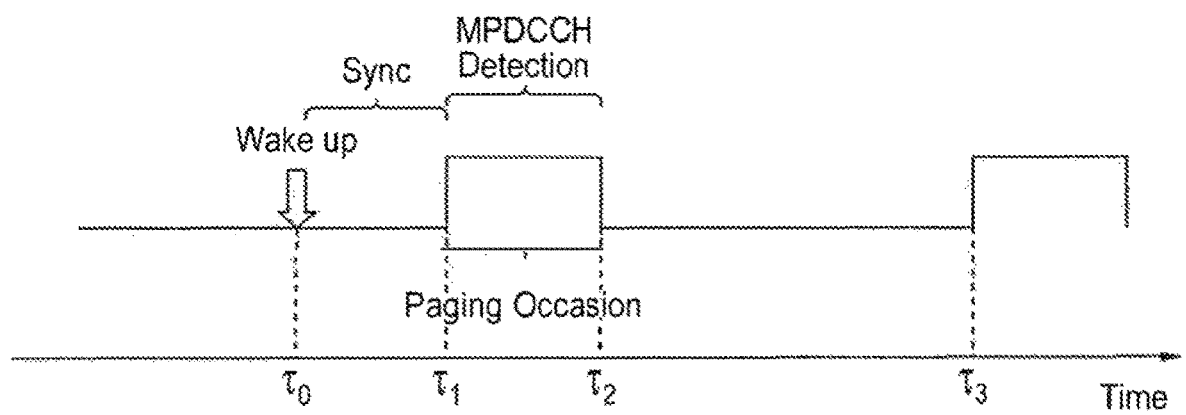
FIGS. 3 and 4 schematically represent time lines associated with paging occasions in wireless telecommunication systems based on known approaches.

FIG. 3 schematically represents a timeline of a paging occasion for a terminal device operating in a known wireless telecommunications system. In the example shown in FIG. 3, one paging occasion is shown and extends from time t1 to t2. As is conventional, paging occasions for a terminal device will typically occur according to a regular repeating schedule having regard to the terminal device's currently configured DRX cycle, Different terminal devices may have different DRX cycle lengths, and so have different times between paging occasions. For a terminal device having a relatively long DRX cycle/time between paging occasions, it is possible the terminal device will to some extent lose synchronisation with the radio network infrastructure equipment of the telecommunications system between paging occasions. In this case it may be helpful for the terminal device to wake up in advance of the paging occasion to allow it to synchronise to the wireless telecommunications system prior to the paging occasion. An example of this is schematically shown in FIG. 3 in which the terminal device wakes up at time t0 so that it can synchronise with the wireless telecommunication system in the period between times t0 and t1 so that it is able to monitor/detect MPDCCH during the configured paging occasion between t1 and t2. In this regard, the process of synchronisation might in some cases only require fine adjustments to frequency and/or timing tracking loops based on detection of CRS (cell-specific reference symbols), e.g. when DRX cycles (times between paging occasions) are relatively short, or a more significant degree of synchronisation may be needed, for example complete re-synchronisation by detecting PSS/SSS (primary synchronisation signals/secondary synchronisation signals) as well as using CRS, e.g. when DRX cycles (times between paging occasions) are relatively long (such that the frequency and timing of the terminal device may become significantly offset relative to that of the radio network infrastructure).

Once the terminal device has re-synchronised to the network, it will monitor MPDCCH to determine if there is a paging message, and if so will go on to decode the PDSCH carrying the paging message in the usual way. If there is no paging message for the terminal device, the terminal device will go back to sleep (low power mode) until the next paging occasion. For certain types of terminal devices, such as MTC devices, it may be expected that paging will occur relatively rarely (e.g. once per day for a smart utility meter), and so in many cases the terminal device may wake up and synchronise to the network to monitor MPDCCH by blind decoding for a potential DCI that may schedule a PDSCH containing a paging message when in fact there is no DCI or paging message for the terminal device. This represents an undesirable "waste" of resources, for example battery power, for the terminal device.

Wake-Up Signal (WUS)

Proposed approaches for eNB-IoT and feMTC in accordance with 3GPP release 15 share several common objectives, and one of these objectives is to reduce power consumption associated with monitoring for paging massages by introducing what is referred to as a wake-up signal (WUS) (e.g. of the type described in C. Hambeck, et al., "A 2.4 µW Wake-up Receiver for wireless, sensor nodes with −71 dBm sensitivity", in IEEE Proceeding International Symposium of Circuits and Systems (ISCAS), 2011, pp. 534-537 [8], or of a type defined in a co-pending European patent application, with application number 17186065.3 [9]). The proposed WUS is carried on a new physical channel and is intended to allow terminal devices to determine whether or not they need to actually decode MPDCCH in an upcoming paging occasion. That is to say, whereas in accordance with previously proposed techniques a terminal device is required to decode MPDCCH during every paging occasion to determine if there is a paging message, and if so to decode PDSCH to determine if the paging message is addressed to the terminal device, the WUS is instead intended to indicate to the terminal device whether or not the next paging occasion contains a paging message that the terminal device should decode. A WUS is transmitted at a pre-determined/derivable time in advance of a scheduled paging occasion such that a terminal device knows when to seek to receive a WUS and may contain relatively little information so that it can be decoded quickly (as compared to the blind decoding needed for MPDCCH). For example, in some implementations the WUS may include a one-bit indication of whether or not there will be a paging message transmitted in the upcoming paging occasion. If the WUS indicates the upcoming paging occasion does include a paging message, any terminal devices for which that paging occasion applies may proceed to decode the paging message as normal to determine if the paging message is addressed to it. If the WUS indicates the upcoming paging occasion does not include any paging message, any terminal device for which that paging occasion applies can determine from this that it does not need to monitor for a paging message during the upcoming paging occasion, and so can, for example, return to a low power mode. In some implementations the WUS may include an identifier for a terminal device that is going to be paged in the paging occasion. This identifier may identify an individual terminal device or may identify a group of terminal devices. The WUS may include multiple identifiers for multiple terminal devices/groups. A terminal device which determines the WUS is associated with an identifier that applies to it may proceed to decode the paging message as normal. Conversely, a terminal device which determines the WUS is not associated with an identifier that applies to it may determine from this that it does not need to monitor for a paging message during the upcoming paging occasion and can, for example, return to a low power mode. The WUS may also be encoded with a format that enables low power decoding (e.g. the WUS may be a narrow bandwidth signal that can be decoded with low power using a low sampling rate receiver), and furthermore may be transmitted with a format that allows reliable decoding even with relatively poor synchronisation.

Figure 4:
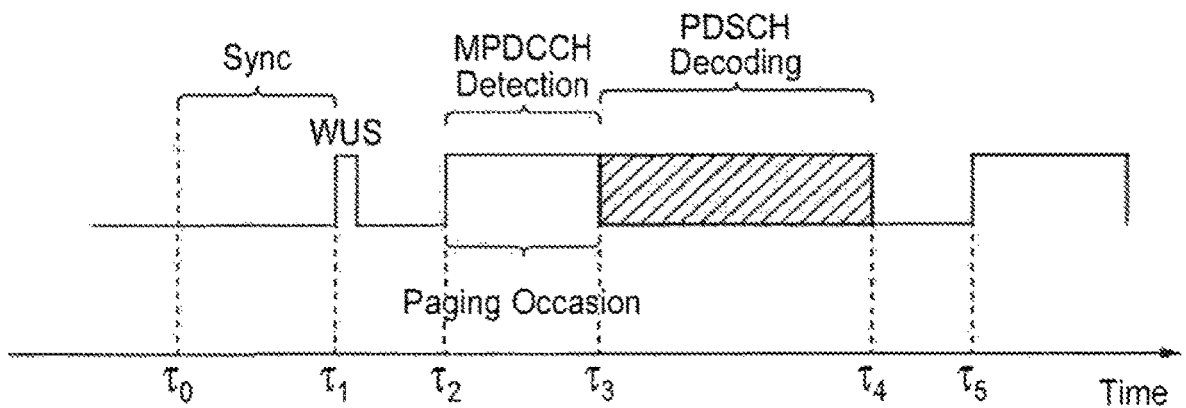

FIG. 4 schematically represents a timeline for a paging occasion for a terminal device operating in a wireless telecommunications system employing a WUS as proposed in association with 3GPP Release 15. In the example shown in FIG. 4, a paging occasion extends from time $\tau 2$ to $\tau 3$. As is conventional, the paging occasions will typically occur according to a regular repeating schedule having regard to the terminal device's currently configured DRX cycle.

As schematically indicated in FIG. 4, a WUS is transmitted at a predetermined/derivable time $\tau 1$ in advance of the paging occasion to indicate there is a MPDCCH paging message transmission for a terminal device indicated by an identifier associated with the WUS (the identifier could identify an individual terminal device or a group of terminal devices). The WUS can indicate that the UE should wake up in order to read the paging occasion for at least one of the following reasons:

The UE is potentially paged in the paging occasion
    WUS may carry a single bit signal indicating whether the paging occasion is active or not
The UE is within a group of UEs, where at least one of the UEs group is paged at the paging occasion
    WUS indicates a UE group ID
The UE is paged at the paging occasion
    WUS indicates the ID of the UE being paged
System Information (SI) has changed and UEs need to re-read the SI
    WUS indicates that SI has changed If the paging occasion is not scheduled to include an MPDCCH and a paging message transmission for a terminal device, then a WUS identifying that terminal device is not sent. Thus a terminal device may be configured to seek to detect a WUS associated with an identifier for the terminal device in advance of an upcoming paging occasion. If the terminal device detects a WUS associated with an identifier for itself, the terminal device can proceed to fine tune its frequency and timing tracking loops if required and blind detects for an MPDCCH between times $\tau 2$ and $\tau 3$, followed by decoding of the PDSCH carrying the paging message between time $\tau 3$ and $\tau 4$ in the usual way. If, however, the terminal device fails to detect a WUS associated with an identifier for the terminal device, the terminal device may assume there is not going to be a paging message for the terminal device in the upcoming paging occasion, and so may go back to sleep (low power mode) and not decode MPDCCH in the paging occasion. As noted above, in some other implementations, the WUS might not include any indication of any specific terminal device(s)/group(s), but may instead simply include an indication of whether or not an upcoming paging occasion includes any paging message. Either way, by using WUS, a terminal device may be expected to consume less energy as it can help avoid unnecessary monitoring/blind decoding of MPDCCH (or equivalent depending on the specific implementation at hand). It will be appreciated that WUS can also be used in connected mode when DRX is used.

If a terminal device is configured for a long DRX cycle (i.e. relatively long time between paging occasions), there may be a significant likelihood the terminal device will lose synchronisation with the radio access network so that it is unable to decode WUS without first synchronising to the radio access network. An example of this is schematically shown in FIG. 4 whereby a terminal device configured for a relatively long DRX cycle may need to wake up at time $\tau 0$ to allow time for it to synchronise to the radio access network before $\tau 1$ so that it can detect any WUS signalling. Current proposals for feMTC synchronisation rely on using PSS/SSS in the same way as for LTE. Because PSS/SSS signalling is typically relatively sparse, e.g. only twice per 10 ms radio frame in LTE, a terminal device needing to synchronise to the network using this general synchronisation signalling is required to start doing so a relatively long time in advance of an expected WUS occasion. This is exacerbated for terminal devices relying on coverage enhancement techniques for reliable communications because of poor radio coverage (e.g. because the terminal device is located in a basement), since coverage enhancement techniques typically rely on aggregating repeat transmissions, meaning the terminal device needs to wake up even sooner to receive a sufficient number of the transmissions before an expected WUS occasion. This can mean terminal devices configured for relatively long DRX cycles can consume relatively large amounts of energy at each paging occasion, and would reduce or even offset the power saving benefit from using WUS.

To help address this issue with existing schemes relying on general synchronisation signalling, such as PSS/SSS in an LTE context, which is transmitted relatively infrequently, it has been proposed to transmit additional synchronisation signalling in association with WUS signalling. See, for example, N. S. Mazloum, O. Edfors, "Performance Analysis and Energy Optimization of Wake-Up Receiver Schemes for Wireless Low-Power Applications", IEEE Transaction on Wireless Communications, December 2014 [10]. In particular, it has been proposed in a co-pending European patent application, with application number 17169577.8 [11] to transmit WUS signalling with synchronisation signalling (e.g. a predetermined/derivable preamble/signature sequence) that can be used by terminal devices to synchronise to the network, for example using conventional correlator techniques.

Figure 5:
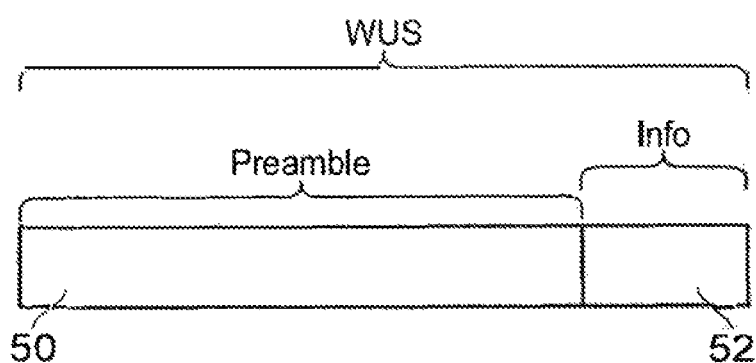
FIG. 5 schematically represents a first example format for wake up signalling (WUS) that may be adapted for use in accordance with certain embodiments of the disclosure.

FIG. 5 schematically represents an example format for wake up signals (WUS) that include a synchronisation preamble (predefined signature sequence) as described in [11]. Thus the WUS represented in FIG. 5 comprises a preamble part 50, which may be of a variable length, and an information ("Info") part 52. The preamble part 50 comprises signalling for terminal devices to use to achieve frequency and/or time synchronisation with the network (i.e. with the radio network infrastructure equipment transmitting the WUS), rather than using the sparsely distributed PSS/SSS (though it should be appreciated that this can still be optionally used in addition to the WUS preamble). The information part 52 comprises an indication of one or more terminal devices to which the WUS applies, e.g. a terminal device identifier and/or an identifier for a group of terminal devices. The terminal device/group identifier(s) may be network allocated identifiers (e.g. radio network temporary identifiers, RNTI) for the terminal device(s), or any other form of suitable identifier, e.g. based on an IMSI for a terminal device.

By providing additional/dedicated synchronisation signalling in association with the WUS, a terminal device may achieve synchronisation with the network using this additional synchronisation signalling transmitted contemporaneously with/around the same time as the WUS, rather than needing to rely on existing general synchronisation signalling, which may be transmitted relatively infrequently in the wireless telecommunications system and so require the terminal device to exit a low power/sleep mode for an extended duration to achieve synchronisation to monitor for WUS signalling.

It will be appreciated there are many modifications that may be made to the approaches set out above in relation to FIG. 5, as described in co-pending European patent application no. 17169577.8, [11], the contents of which are hereby incorporated by reference. For example, the general format for the wake-up signalling may not conform to that shown in FIG. 5, but may have a different format. For example, the wake-up signalling may have a format such as shown in FIG. 6 in which the wake-up signalling comprises a preamble part 60 without a separate information part, and instead, the preamble may itself contain an indication of the identity for the terminal device(s) for which the wake-up signalling indicates a paging message is to be subsequently transmitted.

Figure 6:
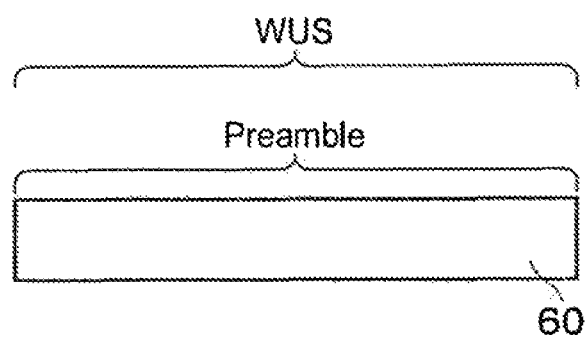
FIG. 6 schematically represents a second example format for wake up signalling (WUS) that may be adapted for use in accordance with certain embodiments of the disclosure.

The WUS's preamble sequence would need to meet some of the following requirements:
- It needs to be relatively short in time tea allow for a quick synchronization and minimize battery power usage;
- It needs to be possible to detect the WUS in a non-coherent manner;
- It needs to be detectable in very poor radio conditions, i.e. SNR=−23 dB, to support coverage enhancement; and
- It needs to be able to carry some information, which is useful for a preamble only type of WUS, as in FIG. 6.

WUS sequence designs which meet these requirements are taught by co-pending European patent application no. 17186065.3 [9], the contents of which are hereby incorporated by reference.

In wireless communications systems discussed herein in relation to embodiments of the present technique, three different error cases are relevant. These are:

Misdetection—A signal is transmitted, but no signal is received.

Incorrect detection—A signal is transmitted, but the signal is received incorrectly. For example, a "1" is transmitted and a "0" is received.

False alarm—No signal is transmitted, but a signal is received.

If the WUS is misdetected (i.e. a WUS is transmitted but the UE fails to detect it), then the UE would miss the corresponding paging message, and so the reliability of the paging is reduced. To avoid misdetection, another Power Saving Signal is proposed, where this signal is always transmitted prior to a paging occasion (PO) and would indicate to the UE whether it should Go To Sleep (i.e. there is no need for the UE to monitor for MPDCCH and PDSCH) or Wake Up (i.e. monitor for MPDCCH and PDSCH in the corresponding PO). This Go to sleep or wake Up Signal (GUS), which is known and proposed in [12], would therefore remove any misdetection since the UE would expect it to be there. The UE will miss a paging occasion if there is an incorrect detection at the UE; i.e. the UP mistakes a Wake Up for a Go To Sleep indication. The drawback of using GUS is that it consumes a lot of resources, since it needs to be transmitted regardless of whether there is any potential paging message for the UE.

Figure 7:
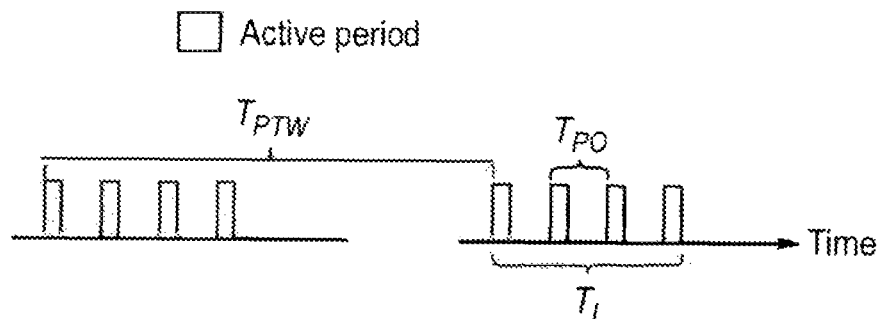
FIG. 7 represents an example of paging time windows comprising one or more paging occasions.

Extended DRX (eDRX) is introduced in Rel-13 for LTE to enable IoT devices to sleep longer, thereby saving power, where the PO cycle is increased from 2.56 seconds to 2621.44 seconds (256 Hyper-frames) for eMTC and 10485.76 seconds (1024 Hyper-frames) for NB-IoT. For a PO cycle that is larger than 5.12 seconds, a Paging Time Window (PTW) is used. A PTW is shown in FIG. 7 which has a time period of $T_L$ and consists of a burst of POs (four POs in this example) followed by deep sleep with a DRX cycle of $T_{PTW}$. Each PTW, consists of one or more POs with a cycle of $T_{PO}$, where in each PO the UP wakes up (active period) to monitor for possible paging messages.

The internal clock used by IoT devices to keep in sync with the eNodeB typically drifts during a DRX period. Assuming the worst case, where the clock drifts in OBC direction (either positive or negative), the longer the DRX the further the UE's sync drifts away from that of the eNodeB. An example is, for an IoT device using a RTC (Real Time Clock) with a drift of 20 ppm, a $T_{PTW}$ of 128 Hyper-frames (1310.72 seconds) would have drifted by 26.2 ms or about 2.5 radio frames. Since a WUS is only transmitted if there is a potential paging message for the UE, the inactive time of the UE may be multiples of $T_{PTW}$ if there is no paging messages for a long time. That is to say, the drift is compounded over several inactive PTW cycles, thereby leading to a larger drift.

One problem with having a large timing drift is that the UE needs to search for a WUS during the whole of the timing drift period. This extended searching window has two ill effects:

The WUS receiver needs to be active for the whole timing drift period, increasing power consumption, and It is possible to receive a false alarm at any time during the timing drift window. Hence an extended timing drift window increases the false alarm rate.

Embodiments of the present technique provide methods and apparatus which can reduce the timing drift window, while not requiring the base station to send a GUS before every paging occasion (where transmission of a GUS consumes resources). Though [12] discusses GUS, and WUS is widely known, there has been no proposal or discussion of the combined use of GUS and WUS under an eDRX operation, as proposed by embodiments of the present technique.

Power Saving Signal Transmissions in eDRX

Embodiments of the present technique allow for the network to transmit a preamble (or more generally, a signal that allows the UE to establish synchronisation with the network) whenever there is inactivity for a long period of time, whilst also using the WUS prior to a PO for which there is a potential paging message. This preamble acts as a synchronisation signal for the UE to re-sync with the eNodeB.

Figure 8:
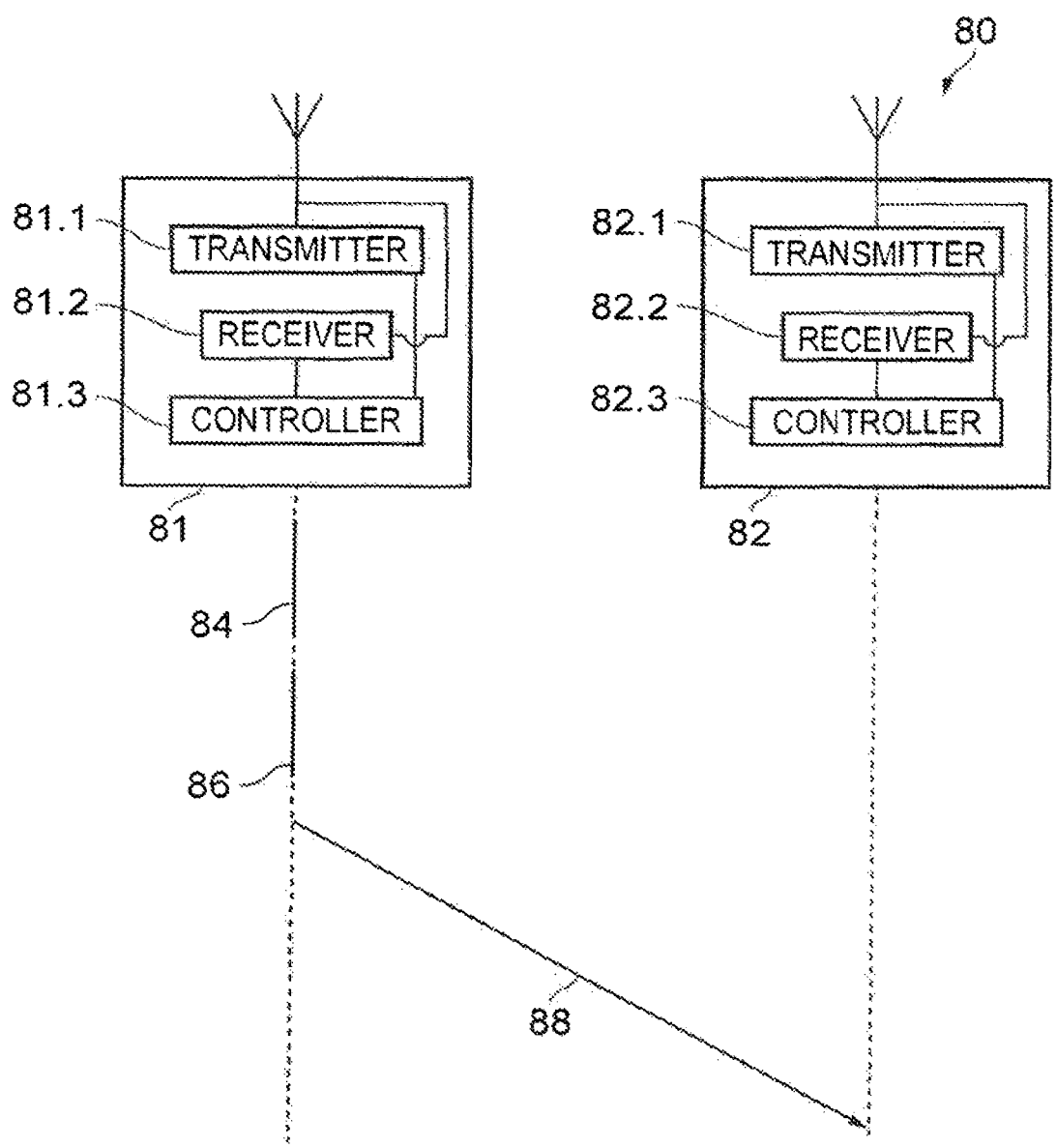
FIG. 8 shows a part schematic, part message flow diagram representation of a communications system in accordance with embodiments of the present technique.

FIG. 8 shows a part schematic, part message flow diagram representation of a communications system 80 in accordance with embodiments of the present technique. The communications system 80 comprises an infrastructure equipment 81 and a communications device 82. Each of the infrastructure equipment 81 and communications device 82 comprise a transmitter (or transmitter circuitry) 81.1, 82.1, a receiver (or receiver circuitry) 81.2, 82.2 and a controller (or controller circuitry) 83.1, 83.2. Each of the controllers 83.1, 83.2 may be, for example, a microprocessor, a CPU, or a dedicated chipset, etc. It will be appreciated by those skilled in the art that, in arrangements of the present technique, the communications device 82 may not always include a transmitter 82.1, for example in scenarios where the communications device 82 is a low-power wearable device.

As shown in FIG. 8, the infrastructure equipment 81 is configured to detect 84 that downlink messages for the communications device 82 to decode should be transmitted by the infrastructure equipment 81 in one or more of a plurality of temporally spaced paging occasions, and that a wake-up signal, WUS, should be transmitted by the infrastructure equipment 81 to the communications device 82 in advance of each of the one or more paging occasions which comprise the downlink messages for the communications device to decode, to determine 86 that a time since a most recent transmission of a signal for use by the communications device to re-synchronise its timing with the infrastructure equipment from the infrastructure equipment 81 to the communications device 82 is greater than a predetermined threshold, and to transmit 88, in response to determining 86 that the time since the most recent transmission from the infrastructure equipment 81 to the communications device 82 is greater than the predetermined threshold, a preamble signal to the communications device 82, the preamble signal for use by the communications device 82 as a synchronisation signal for the communications device 82 to re-synchronise its timing with the infrastructure equipment 81. In some embodiments of the present technique, the infrastructure equipment 81 may be an eNodeB, and the detection 84 of the downlink messages for transmission to the communications device 82 may be in response to receiving commands from a mobility management entity, the infrastructure equipment 81 (eNodeB) and the mobility management entity both forming part of the same mobile communications network.

Figure 9:
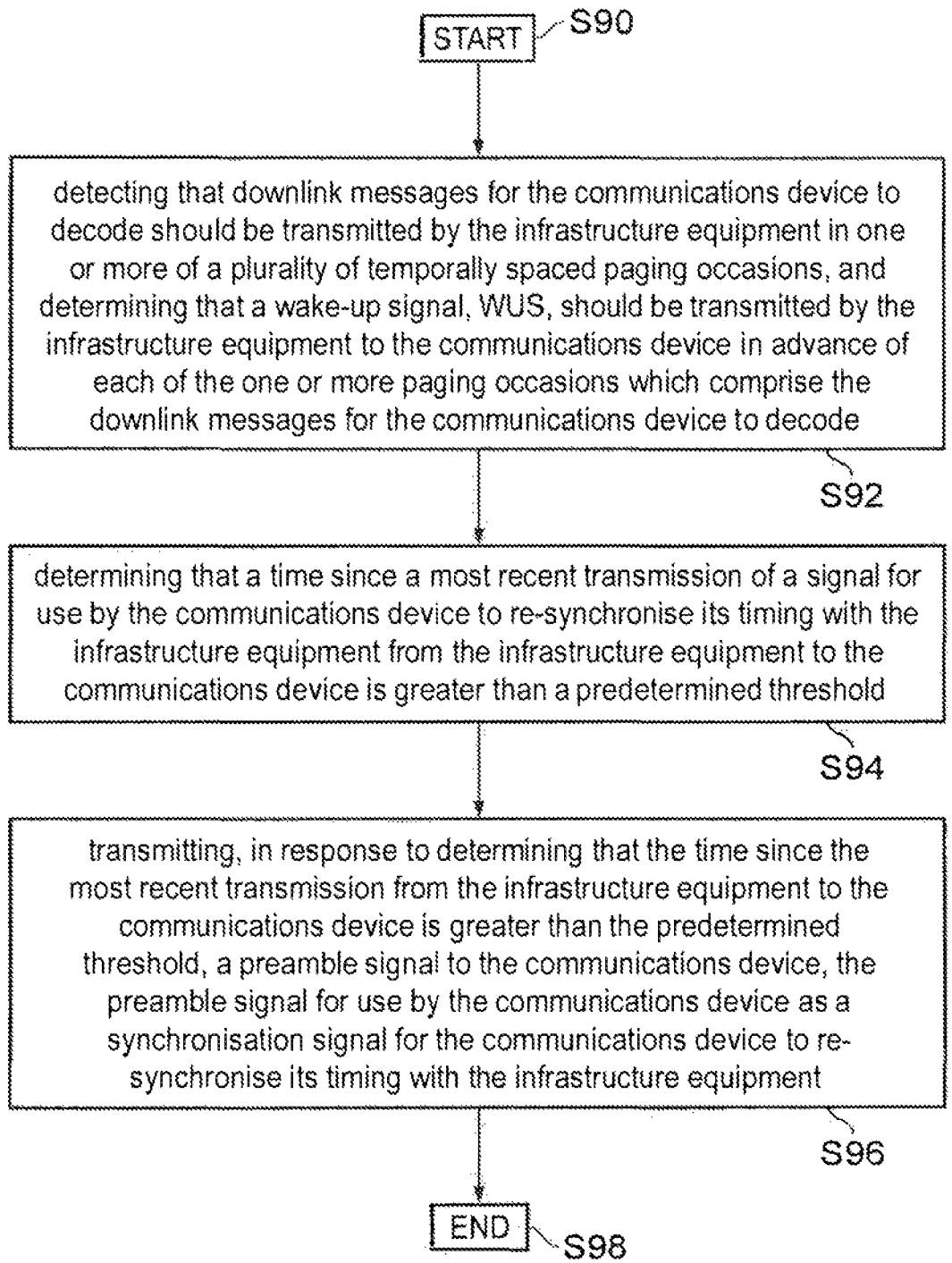
FIG. 9 shows a flow diagram illustrating a process of communications in a communications system in accordance with embodiments of the present technique.

FIG. 9 shows a flow diagram illustrating a method of operating an infrastructure equipment in a wireless communications system comprising the infrastructure equipment and a communications device in accordance with embodiments of the present technique. The flow diagram of FIG. 9 corresponds to the part schematic, part message flow diagram representation of a communications system in accordance with embodiments of the present technique. The method starts in step S90. The method comprises in step S92, detecting that downlink messages for the communications device to decode should be transmitted by the infrastructure equipment in one or more of a plurality of temporally spaced paging occasions, and determining that a wake-up signal, WUS, should be transmitted by the infrastructure equipment to the communications device in advance of each of the one or more paging occasions which comprise the downlink messages for the communications device to decode. In step S94, the process comprises determining, that a time since a most recent transmission of a signal for use by the communications device to re-synchronise its timing with the infrastructure equipment from the infrastructure equipment to the communications device is greater than a predetermined threshold. In step S96, the method comprises transmitting, in response to determining that the time since the most recent transmission from the infrastructure equipment to the communications device is greater than the predetermined threshold, a preamble signal to the communications device, the preamble signal for use by the communications device as a synchronisation signal for the communications device to re-synchronise its timing with the infrastructure equipment. The process ends in step S98.

In some embodiments of the present technique, the preamble is a GUS, i.e. a GUS is transmitted at the start of every N PTW cycles and within a PTW a WUS is used prior to every PO. In other words, the downlink messages should be transmitted during one or more as plurality of paging time windows, each paging time window comprising one or more of the paging occasions, each of the paging time windows being spaced by a time greater than the predetermined threshold. Also, in other words, each WUS comprises an indication to the communications device of whether or not the paging occasion which the each WUS precedes comprises a downlink message for the communications device to decode. Additionally, one or more of the preamble signals are go-to-sleep or wake-up signals, GUSs. In other words, in these embodiments, the method comprises transmitting, by the infrastructure equipment, one of the GUSs immediately before every N of the paging time windows, where N is an integer which equals one or more.

Figure 10:
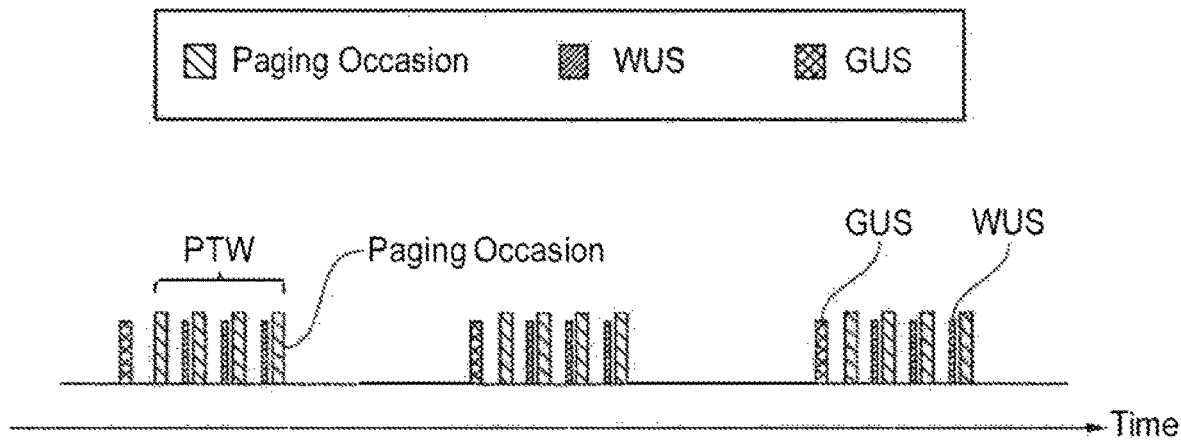
FIG. 10 illustrates a first example implementation of GUS and WUS transmissions in accordance with embodiments of the present technique.

An example is shown in FIG. 10 where N=1, i.e. a GUS is transmitted prior to every PTW and within the PTW a WUS may be transmitted prior to each PO. Although in FIG. 10 the WUS is shown to be transmitted prior to every PO, it should be appreciated that this is just an example and that in actual operation the WUS is only transmitted if there is a potential paging message for one or more UEs in the corresponding PO. Note that a WUS is not monitored by the UE prior to the first PO in the PTW since the GUS would indicate whether that PO is active (contains paging message for at least one UE) or inactive. Since a GUS is transmitted regardless of whether there is a potential paging message in the corresponding PO, this method would allow the use of the GUS as a synchronisation signal by the UE when it is deemed that the UE may have drilled beyond an intolerable threshold. These embodiments of the present technique also recognise that GUSs consume resources and by limiting them to the start of the PTWs, the resources used are minimised. Since WUSs are only transmitted if a PU is active, then this method would optimise resources if the portion of active POs is small (which is expected for IoT services) compared to using GUSs. Furthermore the factor N can be used by the eNodeB to manage the resources used for GUS and the level of drift between eNodeB and UE (assuming the drift rate is known from specifications).

In other words, a broader level, in FIG. 10, the Power Saving Signal transmitted prior to every N PTWs has a different characteristic than those transmitted prior to the remaining POs within the PTW. Here the GUS transmitted prior to the PTW has a different characteristic that a WUS that are transmitted in remaining POs within the PTW.

Another difference in characteristic is that the length Power Saving Signal transmitted prior to every N PTWs is different to those transmitted prior to the remaining POs within that PTW. That is, in the example in FIG. 10, the length of the GUS (for example the number of repetitions of a primitive GUS sequence) may be greater than the length of the WUS. This is advantageous since there may be a large timing drift between PTW and synchronisation requires a greater amount of signal energy when the timing drift is larger, where signal energy is provided by repetition/lengthening of the GUS signals. Since the timing drift is reduced to a small amount after reception of the GUS, the WUS signals prior to each following paging occasion may be of shorter duration than the GUS (i.e. of shorter duration than the preamble signal prior to the PTW), thus saving on the resources required to transmit the WUS. In other words, a number of repetitions of the first reference sequence of the GUS (or preamble signal) is different to a number of repetitions of the second reference sequence of the WUS, or a length of the preamble signal is different to a length of the WUS.

In some embodiments, the length (for example represented by a number of repetitions of a primitive or base sequence) of a WUS or GUS depends on the time since the communications device could have last previously synchronised. In other words a length of the preamble signal is dependent on a time since the most recently transmitted preamble signal was transmitted from the infrastructure equipment to the communications device.

Figure 11:
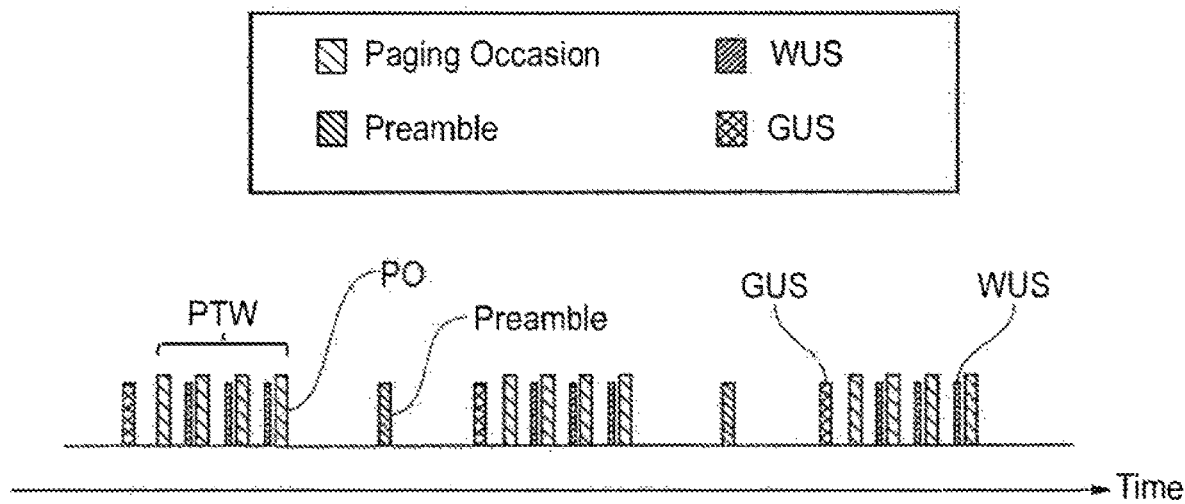
FIG. 11 illustrates a second example implementation of GUS and WUS transmissions in accordance with embodiments of the present technique, where preambles are transmitted in between paging time windows.

In some embodiments of the present technique, the preamble is transmitted in between two PTWs. If a GUS is used as a preamble then the GUS would indicate "Go To Sleep" in such intermediate preambles. This is for cases where the eDRX, cycle is too long and hence transmitting a preamble between two PTW would allow the UE to achieve synchronisation with the network and hence reduces the drift when its PTW arrives. An example is shown in FIG. 11, where prior to each PTW a GUS is transmitted and within a PTW a WUS may be transmitted prior to each PO depending on whether there is any potential paging message. In between two PTW, a preamble is transmitted for synchronisation purposes. It should be appreciated that this preamble can also be a GUS (set to indicate Go To Sleep) and that more than one preamble can be transmitted between two PTWs if the PTWs are too far apart.

Figure 12:
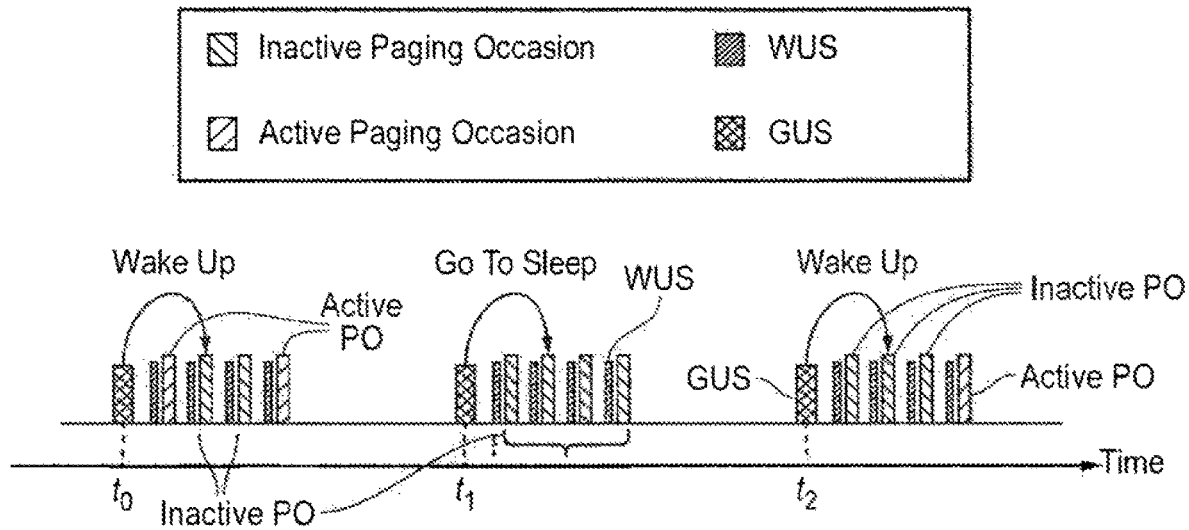
FIG. 12 illustrates a third example implementation of GUS and WUS transmissions in accordance with embodiments of the present technique, where the GUS indicates active or inactive paging time windows.

In some embodiments of the present technique, the said preamble or GUS that is transmitted prior to the start of a PTW would indicate whether the entire PTW contains any potential paging message to the UE. That is, the preamble or GUS would indicate whether the UE can ignore all the POs within the corresponding PTW or whether it needs to wake up and monitor a WUS for each PO within that PTW. A Wake Up is indicated if at least one of the POs are active, i.e. contains a paging message addressing at least one of the UEs in the group (note it is expected that the GUS and WUS signals are for a group of UEs and not all UEs would be paged), otherwise if none of the POs are active the GUS indicates Go To Sleep. An example is shown in FIG. 12, where a GUS is transmitted prior to each PTW. At time $t_0$, a GUS is transmitted and the corresponding PTW has 2 POs that have paging messages for at least one UE within the group of UEs. Here the GUS indicates a Wake Up to the UE (or group of UEs). At time $t_1$ a Go To Sleep is indicated by the GUS since no PO is active (i.e. no PO contains a paging message) for any UE within the group of UEs. It should be appreciated that the PO may be active for other groups of UEs and so a separate GUS would be used to indicate paging activity to those UEs. It should be noted that a WUS is monitored by the UE from the first PO in the PTW since the GUS indicates whether there are any active POs rather than whether a specific PO is active or not. In other words, each GUS comprises an indication to the communications device of whether or not one or more of the paging occasions in the paging time window which the each GUS precedes comprise a downlink message for the communications device to decode. In other words, each GUS indicates that the communications device should wake up if one or more of the paging occasions in the paging time window which each GUS precedes comprise a downlink message for the communications device to decode, or each GUS indicates that the communications device should go to sleep if none of the paging occasions in the paging time window which each GUS precedes comprise a downlink message for the communications device to decode.

Figure 13:
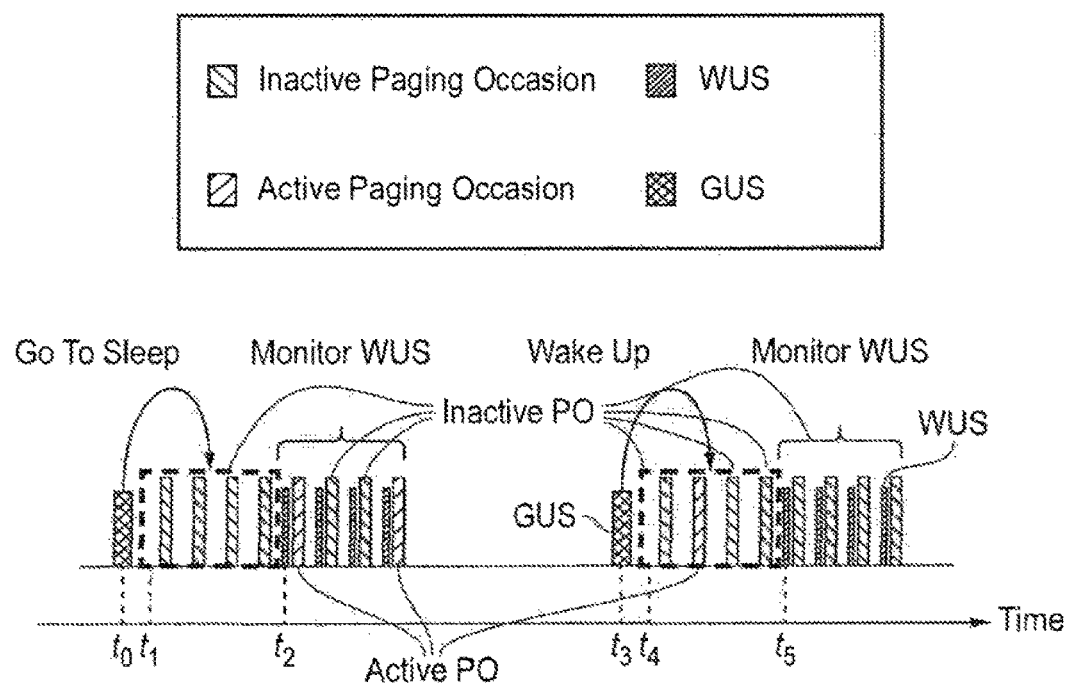
FIG. 13 illustrates a fourth example implementation of GUS and WUS transmissions in accordance with embodiments of the present technique, where the GUS indicates a portion of paging time windows that may be active.

In some embodiments of the present technique, a GUS could indicate whether any POs are active within a portion of the PTW, i.e. for example if a PTW contains 8 POs, the GUS can indicate whether the first 4 POs are active. The UE then needs to monitor a WUS or possibly another GUS for the remaining POs in the PTW. An example is shown in FIG. 13, where a PTW contains 8 POs. At time $t_0$ a GUS is transmitted and indicates that the first 4 POs are inactive thereby transmitting a Go To Sleep signal to the group of UEs, i.e. each goes to sleep from time $t_1$ till $t_2$ and will not monitor for anything. However, this group of UEs would have to monitor for possible WUS after the $4^{th}$ PO at time $t_0$. At time t3, a GUS is transmitted and indicates a Wake Up since one of the second 4 POs in the corresponding PTW is active. Here, the UE would have to monitor for WUS for the rest of the PTW. As described, a separate GUS can be transmitted at time $t_5$ to indicate that the last 4 POs are inactive. The number of POs that the GUS can indicate to be active or not can be configured by the network or specified in the specifications e.g. as a percentage of the total PO. This embodiment recognises that the eNB scheduler may not be able to schedule too far ahead and so for a PTW with a large number of POs, it may not be practical or may even be restrictive for a GUS to indicate whether all the POs in the PTW are inactive ahead of time. It should be appreciated that although the example in FIG. 13 shows that the GUS addresses only the first few POs within a PTW, this embodiment is also applicable if the portion of the PTW addresses another subset of POs that may reside in the middle or the end of the PTW. In other words, each GUS comprises an indication to the communications device of whether or not one or more of the paging occasions in a subset of the paging time window which the each GUS precedes comprise a downlink message for the communications device to decode.

Figure 14:
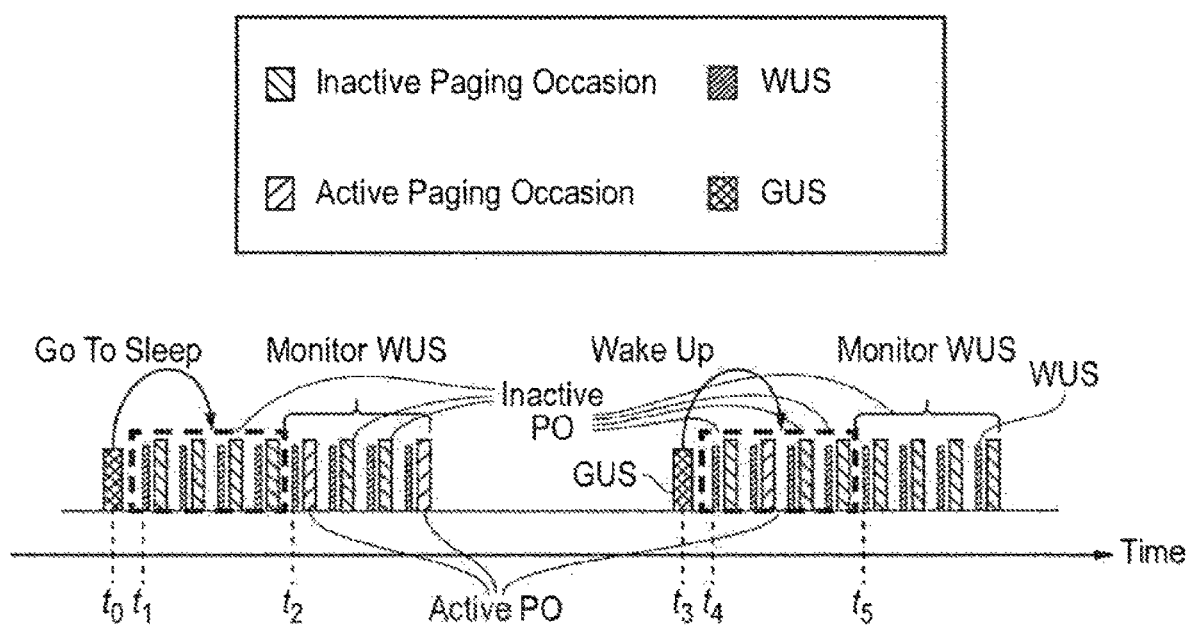
FIG. 14 illustrates a fifth example implementation of GUS and WUS transmissions accordance with embodiments of the present technique, where the GUS indicates a portion of paging time windows that may be active, where the paging occasions in that active region are controlled by WUSs.

In some embodiments of the present technique, a GUS can indicate whether a portion of the PTW is active and each PO within that portion is controlled by a WUS, as shown in FIG. 14. This Figure shows:

$t_0$: GUS indicates "Go To Sleep" for the portion of PTW from $t_1$ to $t_2$. Hence the UE does not monitor paging occasions between $t_1$ and $t_2$ $t_2$: the UE monitors WUS to determine whether paging occasions are active or not within the portion of the PTW that is not controlled by GUS $t_3$: GUS indicates "Wake Up" for the portion of the PTW from $t_4$ to $t_5$.

$t_4$ to $t_5$: UE monitors WUS before each paging, occasion and decodes MPDCCH in the paging occasion if WUS indicates that the associated PO is active $t_5$: the UE monitors WUS to determine whether paging occasions are active or not within the portion of the PTW that is not controlled by GUS As described in [9], the WUS may comprise $N_p$ WUS preamble symbols followed by $N_d$ WUS signalling symbols if needed. Each WUS OFDM preamble symbol comprises 3 components:

Pseudo-random Sequence (PN)
Zadoff-Chu (ZC) sequence
Frequency shift function.

The dot product of the PN and ZC sequences forms the WUS preamble sequence. Each WUS preamble symbol is constructed as an OFDM symbol in the frequency domain by mapping the elements of the WUS preamble sequence to the designated subcarriers of the OFDM symbol. For each WUS preamble OFDM symbol, the PN sequence is initialized by the Cell ID so that a WUS is linked to the cell and this would also randomize the WUS so that it is orthogonal to the WUS from other cells. The use of ZC sequences is meant to provide good correlation properties at the UE receiver and low PAPR for the transmitted signal. The WUS preamble sequence for preamble symbol m is $X_m(k)$ is:

$$X_m(k)=P_m(k)Z(k)$$

where, $P_m(k)$ is the PN sequence, $Z(k)$ is the Zadoff-Chu sequence for k=0, 1, 2, . . . $N_{SC}$−1 where $N_{SC}$ is the number of sub-carriers used for the WUS signal.

The WUS preamble symbol is then formed by:

$$w_m(k)=x_m(k)e^{-ja_m k}$$

where $x_m(k)$ is the inverse Fourier transform of $X_m(k)$ and $a_m$ is a frequency shift component for preamble symbol m.

In embodiments of the present technique, both a GUS and a WUS may be formed in the same way as described above in relation to the disclosure of [9]. Furthermore, in some embodiments, the WUS sequence may be one of the sequences used by the GUS. As described above, in [9] a Tower Saving Signal sequence is described, where in embodiments of the present technique the sequence can be used as a WUS or GUS. When it is used as a GUS, a different ZC root or a different PN or a different frequency shift can be used to distinguished between a Go To Sleep indication and a Wake Up indication. The GUS may be constructed as two derivations of a Power Saving Signal sequence, and the WUS is one of such derivations. For example the GUS consists of the ZC sequence with a root of $q_s$ used to indicate "Go Sleep" whilst a ZC sequence with root $q_w$ is used to indicate "Wake Up". The corresponding WUS would therefore use a ZC with a root of $q_s$. Such embodiments of the present technique therefore minimise the number of sequences required for GUS and WUS, which would reduce the eNodeB and UE complexities in managing, the number of required sequences. In other words, in such embodiments, each GUS comprises a preamble formed by a plurality of Orthogonal Frequency Division Multiplexed, OFDM, symbols, each of the OFDM symbols being modulated with a first reference sequence intended to indicate a Wake Up to the UE, or a second reference sequence intended to indicate a Go To Sleep to the UE and wherein one or more of the OFDM symbols are transmitted having been shifted in frequency with respect to successive others of the OFDM symbols. Each WUS comprises a preamble formed by a plurality of Orthogonal Frequency Division Multiplexed, OFDM, symbols, each of the OFDM symbols being modulated with a reference sequence, the reference sequence being the first of reference sequences used for the GUS, and wherein one or more of the OFDM symbols are transmitted having been shifted in frequency with respect to successive others of the OFDM symbols.

In some embodiments of the present technique, different ZC roots of a GUS can be used to indicate different potential subsets of active or in POs. In other words, the first reference sequence is dependent on whether or not one or more of the paging occasions in the paging time window which each GUS precedes or in a subset of the paging time window which each GUS precedes comprise a downlink message for the communications device to decode.

The Applicant's co-pending patent applications published under publications numbers US 2017/026219 A1 [13], US 2017/026220 A1 [14] and US 2017/026221 A1 [15] each disclose bootstrap signals for digital television, where the bootstrap signals comprise OFDM symbols which are combined with reference sequences. The reference sequences are a combination of PN and ZC sequences. However, the disclosures of these co-pending patent applications are not appropriate for describing WUSs or GUSs, as described by embodiments of the present technique, because there are no prefix and postfix OFDM symbols as are present in the bootstrap signals for digital television. The contents of US 2017/026219 A1 [13], US 2017/026220 A1 [14] and US 2017/026221 A1 [15] are each incorporated herein by reference.

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A method of operating an infrastructure equipment in a wireless communications system comprising the infrastructure equipment and a communications device, wherein the method comprises:
    detecting that downlink messages for the communications device to decode should be transmitted by the infrastructure equipment in one or more of a plurality of temporally spaced paging occasions, and determining that a wake-up signal, WUS, should be transmitted by the infrastructure equipment to the communications device in advance of each of the one or more paging occasions which comprise the downlink massages for the communications device to decode;
    determining that a time since a most recent transmission of a signal which can be used by the communications device to re-synchronise with the infrastructure equipment is greater than a predetermined threshold; and
    transmitting, in response to determining that the time since the most recent transmission from the infrastructure equipment to the communications device is greater than the predetermined threshold, a preamble signal to the communications device, the preamble signal for use by the communications device as a synchronisation signal for the communications device to re-synchronise its timing with the infrastructure equipment.

Paragraph 2. A method according to Paragraph 1, wherein the downlink messages should be transmitted during one or more of a plurality of paging time windows, each paging time window comprising one or more of the paging occasions, each of the paging time windows being spaced by a time greater than the predetermined threshold.

Paragraph 3. A method according to Paragraph 1 or 2, wherein one or more of the preamble signals are go-to-sleep or wake-up signals, GUSs.

Paragraph 4. A method according to Paragraph 3, comprising
    transmitting, by the infrastructure equipment, one of the GUSs immediately before every N of the paging time windows, where N is an integer which equals one or more.

Paragraph 5. A method according to Paragraph 3 or 4, wherein each WUS comprises an indication to the communications device of whether or not the paging, occasion which the each WUS precedes comprises a downlink message for the communications device to decode.

Paragraph 6. A method according to Paragraph 4 or 5, wherein each GUS comprises an indication to the communications device of whether or not one or more of the paging occasions in the paging time window which the each GUS precedes comprise a downlink message for the communications device to decode.

Paragraph 7. A method according to Paragraph 6, wherein the each GUS indicates that the communications device should wake up if one or more of the paging occasions in the paging time window which the each GUS precedes comprise a downlink message for the communications device to decode.

Paragraph 8. A method according to Paragraph 6, wherein the each GUS indicates that the communications device should go to sleep if none of the paging occasions in the paging time window which the each GUS precedes comprise a downlink message for the communications device to decode.

Paragraph 9. A method according to Paragraph 4 or 5, wherein each GUS comprises an indication to the communications device of whether or not one or more of the paging occasions in a subset of the paging time window which the each GUS precedes comprise a downlink message for the communications device to decode.

Paragraph 10. A method according to any of Paragraphs 3 to 9, wherein each GUS comprises a preamble formed by a plurality of Orthogonal Frequency Division Multiplexed, OFDM, symbols, each of the OFDM symbols being modulated with a first reference sequence, and wherein one or more of the OFDM symbols are transmitted having been shifted in frequency with respect to successive others of the OFDM symbols.

Paragraph 11. A method according to Paragraph 10, wherein each WUS comprises a preamble formed by a plurality of Orthogonal Frequency Division Multiplexed, OFDM, symbols, each of the OFDM symbols being modulated with a second reference sequence, the second reference sequence being a subset of the filet reference sequence, and wherein one or more of the OFDM symbols are transmitted having been shifted in frequency with respect to successive others of the OFDM symbols.

Paragraph 12. A method according to Paragraph 10 or Paragraph 11, wherein the first reference sequence is dependent on whether or not one or more of the paging occasions in the paging time window which the each GUS precedes or in a subset of the paging time window which the each GUS precedes comprise a downlink message for the communications device to decode.

Paragraph 13. A method according to Paragraph 11, wherein a number of repetitions of the first reference sequence of the GUS is different to a number of repetitions of the second reference sequence of the WUS.

Paragraph 14. A method according to any of Paragraphs 1 to 13, wherein a length of the preamble signal is different to a length of the WUS.

Paragraph 15. A method according to any of Paragraphs 1 to 13, wherein a length of the preamble signal is dependent on a time since the most recently transmitted preamble signal was transmitted from the infrastructure equipment to the communications device.

Paragraph 16. A method of operating an infrastructure equipment in a wireless communications system comprising the infrastructure equipment and a communications device, wherein the method comprises:
    detecting that downlink messages for the communications device to decode should be transmitted by the infrastructure equipment during one or more of a plurality of temporally spaced paging tune windows, each paging time window comprising one or more of a plurality of temporally spaced paging occasions, and determining that a wake-up signal, WUS, should be transmitted by the infrastructure equipment to the communications device in advance of each of the one or more paging occasions which comprise the downlink messages for the communications device to decode; and
    transmitting, in advance of every N of the paging time windows, where N is an integer which equals one or more, a preamble signal to the communications device, the preamble signal for use by the communications device as a synchronisation signal for the communications device to re-synchronise its timing with the infrastructure equipment.

Paragraph 17. A method according to Paragraph 16, wherein one or more of the preamble signals are go-to-sleep or wake-up signals, GUSs.

Paragraph 18. An infrastructure equipment for use in a wireless communications system comprising the infrastructure equipment and a communications device, the infrastructure equipment comprising transceiver circuitry and controller circuitry which are configured in combination
    to detect that downlink messages for the communications device to decode should be transmitted by the infrastructure equipment in one or more of a plurality of temporally spaced paging occasions, and to determine that a wake-up signal, WUS, should be transmitted by the infrastructure equipment to the communications device in advance of each of the one or more paging occasions which comprise the downlink messages for the communications device to decode;
    to determine that a time since a most recent transmission of a signal which can be used by the communications device to re-synchronise with the infrastructure equipment is greater than a predetermined threshold; and
    to transmit, in response to determining that the time since the most recent transmission from the infrastructure equipment to the communications device is greater than the predetermined threshold, a preamble signal to the communications device, the preamble signal for use by the communications device as a synchronisation signal for the communications device to re-synchronise its timing with the infrastructure equipment.

Paragraph 19. Circuitry for an infrastructure equipment for use in a wireless communications system comprising the infrastructure equipment and a communications device, the infrastructure equipment comprising transceiver circuitry and controller circuitry which are configured in combination
    to detect that downlink messages for the communications device to decode should be transmitted by the infrastructure equipment in one or more of a plurality of temporally spaced paging occasions, and to determine that a wake-up signal, WUS, should be transmitted by the infrastructure equipment to the communications device in advance of each of the one or more paging occasions which comprise the downlink messages for the communications device to decode;
    to determine that a time since a most recent transmission of a signal which can be used by the communications device to re-synchronise with the infrastructure equipment is greater than a predetermined threshold; and
    to transmit, in response to determining that the time since the most recent transmission from the infrastructure equipment to the communications device is greater than the predetermined threshold, a preamble signal to the communications device, the preamble signal for use by the communications device as a synchronisation signal for the communications device to re-synchronise its timing with the infrastructure equipment.

Paragraph 20. An infrastructure equipment for use in a wireless communications system comprising the infrastructure equipment and a communications device, the infrastructure equipment comprising transceiver circuitry and controller circuitry which are configured in combination
    to detect that downlink messages for the communications device to decode should be transmitted by the infrastructure equipment during one or more of a plurality of temporally spaced paging time windows, each paging time window comprising one or more of a plurality of temporally spaced paging occasions, and to determine that a wake-up signal, WUS, should be transmitted by the infrastructure equipment to the communications device in advance of each of the one or more paging occasions which comprise the downlink messages for the communications device to decode; and
    to transmit, in advance of every N of the paging time windows, where N is an integer which equals one or more, a preamble signal to the communications device, the preamble signal for use by the communications device as a synchronisation signal for the communications device to re-synchronise its timing with the infrastructure equipment.

Paragraph 21. Circuitry for an infrastructure equipment for use in a wireless communications system comprising the infrastructure equipment and a communications device, the infrastructure equipment comprising transceiver circuitry and controller circuitry which are configured in combination
    to detect that downlink messages for the communications device to decode should be transmitted by the infrastructure equipment during one or more of a plurality of temporally spaced paging time windows, each paging time window comprising one or more of a plurality of temporally spaced paging occasions, and to determine that a wake-up signal, WUS, should be transmitted by the infrastructure equipment to the communications device in advance of each of the one or more paging occasions which comprise the downlink messages for the communications device to decode; and
    to transmit, in advance of every N of the paging time windows, where N is an integer which equals one or more, a preamble signal to the communications device, the preamble signal for use by the communications device as a synchronisation signal for the communications device to re-synchronise its timing with the infrastructure equipment.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75, Dubrovnik, Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] Holma H. and Toskala A, "LTE for UMTS OFDMA and SC-FDMA based radio access", John Wiley and Sons, 2009.
[6] 3GPP TS 36.304 version 14.2.0 Release 14.
[7] 3GPP TS 36.321 version 13.5.0 Release 13.
[8] C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537.
[9] European patent application no. 17186065.3.
[10] N. S. Maxloum, O. Edfors, "Performance Analysis and Energy Optimization of Wake-Up Receiver Schemes for Wireless Low-Power Applications," IEEE Transactions on Wireless Communications, December 2014.
[11] European patent application no. 17169577.8.
[12] R1-1708311, "Idle Mode Power Efficiency Reduction," Sierra Wireless, RAN1 #89.
[13] US patent application, publication no. US 2017/026219 A1.
[14] US patent application, publication no. US 2017/026220 A1.
[15] US patent application, publication no. US 2017/026221 A1.

What is claimed is:

1. A method of operating a communications device in a wireless communications system comprising an infrastructure equipment and the communications device, wherein the method comprises:
decoding downlink messages transmitted by the infrastructure equipment in one or more of a plurality of temporally spaced paging occasions;
decoding a wake-up signal (WUS) transmitted by the infrastructure equipment in advance of each of the one or more paging occasions which comprise the downlink messages; and
receiving, in response to determining that a time since a most recent transmission from the infrastructure equipment to the communications device is greater than a predetermined threshold, a preamble signal from the infrastructure equipment, and re-synchronizing with the infrastructure equipment based on the preamble signal.

2. The method of claim 1, wherein
the downlink messages are received during one or more of a plurality of paging time windows, each paging time window comprising one or more of the paging occasions, each of the paging windows being spaced by a time greater than the predetermined threshold.

3. The method of claim 2, wherein
one or more of the preamble signals are go-to-sleep or wake-up signals (GUSs).

4. The method of claim 3, further comprising:
receiving, from the infrastructure equipment, one of the GUSs immediately before every N of the paging time windows, where N is an integer which equals one or more.

5. The method of claim 4, wherein
each GUS comprises an indication of whether one or more of the paging occasions in the paging time window which the each GUS precedes comprise a downlink message for the communications device to decode.

6. The method of claim 5, wherein
the each GUS indicates that the communications device should wake up if one or more of the paging occasions in the paging time window which the each GUS precedes comprise a downlink message for the communications device to decode.

7. The method of claim 5, wherein
the each GUS indicates that the communications device should go to sleep if none of the paging occasions in the paging time window which the each GUS precedes comprise a downlink message for the communications device to decode.

8. The method of claim 3, wherein
each WUS comprises an indication of whether the paging occasion which the each WUS precedes comprises a downlink message for the communications device to decode.

9. The method of claim 4, wherein
each GUS comprises an indication to the communications device of whether or not one or more of the paging occasions in a subset of the paging time window which the each GUS precedes comprise a downlink message for the communications device to decode.

10. The method of claim 3, wherein
each GUS comprises a preamble formed by a plurality of Orthogonal Frequency Division Multiplexed (OFDM) symbols, each of the OFDM symbols being modulated with a first reference sequence, and wherein one or more of the OFDM symbols are transmitted having been shifted in frequency with respect to successive others of the OFDM symbols.

11. The method of claim 10, wherein
each WUS comprises a preamble formed by a plurality of OFDM symbols, each of the OFDM symbols being modulated with a second reference sequence, the second reference sequence being a subset of the first reference sequence, and wherein one or more of the OFDM symbols are transmitted having been shifted in frequency with respect to successive others of the OFDM symbols.

12. The method of claim 11, wherein
a number of repetitions of the first reference sequence of the GUS is different than a number of repetitions of the second reference sequence of the WUS.

13. The method of claim 10, wherein
the first reference sequence is dependent on whether one or more of the paging occasions in the paging time window which the each GUS precedes or in a subset of the paging time window which the each GUS precedes comprise a downlink message for the communications device to decode.

14. The method of claim 1, wherein
a length of the preamble signal is different than a length of the WUS.

15. The method of claim 1, wherein
a length of the preamble signal is dependent on a time since the most recently transmitted preamble signal was transmitted from the infrastructure equipment to the communications device.

16. The communications device of claim 1, wherein
the circuitry is configured to receive the downlink messages during one or more of a plurality of paging time windows, each paging time window comprising one or more of the paging occasions, each of the paging windows being spaced by a time greater than the predetermined threshold.

17. The communications device of claim 16, wherein
one or more of the preamble signals are go-to-sleep or wake-up signals (GUSs).

18. The communications device of claim 17, wherein
the circuitry is configured to receive, from the infrastructure equipment, one of the GUSs immediately before every N of the paging time windows, where N is an integer which equals one or more.

19. The communications device of claim 17, wherein
each WUS comprises an indication of whether the paging occasion which the each WUS precedes comprises a downlink message for the communications device to decode.

20. A communications device comprising:
circuitry configured to
decode downlink messages transmitted by infrastructure equipment of a wireless communication system in one or more of a plurality of temporally spaced paging occasions;
decode a wake-up signal (WUS) transmitted by the infrastructure equipment in advance of each of the one or more paging occasions which comprise the downlink messages; and
receive, in response to determining that a time since a most recent transmission from the infrastructure equipment to the communications device is greater than a predetermined threshold, a preamble signal from the infrastructure equipment, and re-synchronizing with the infrastructure equipment based on the preamble signal.

* * * * *